No. 651,659. Patented June 12, 1900.
R. J. GATLING.
CULTIVATOR.
(Application filed Aug 10, 1899.)
(No Model.) 2 Sheets—Sheet 1.
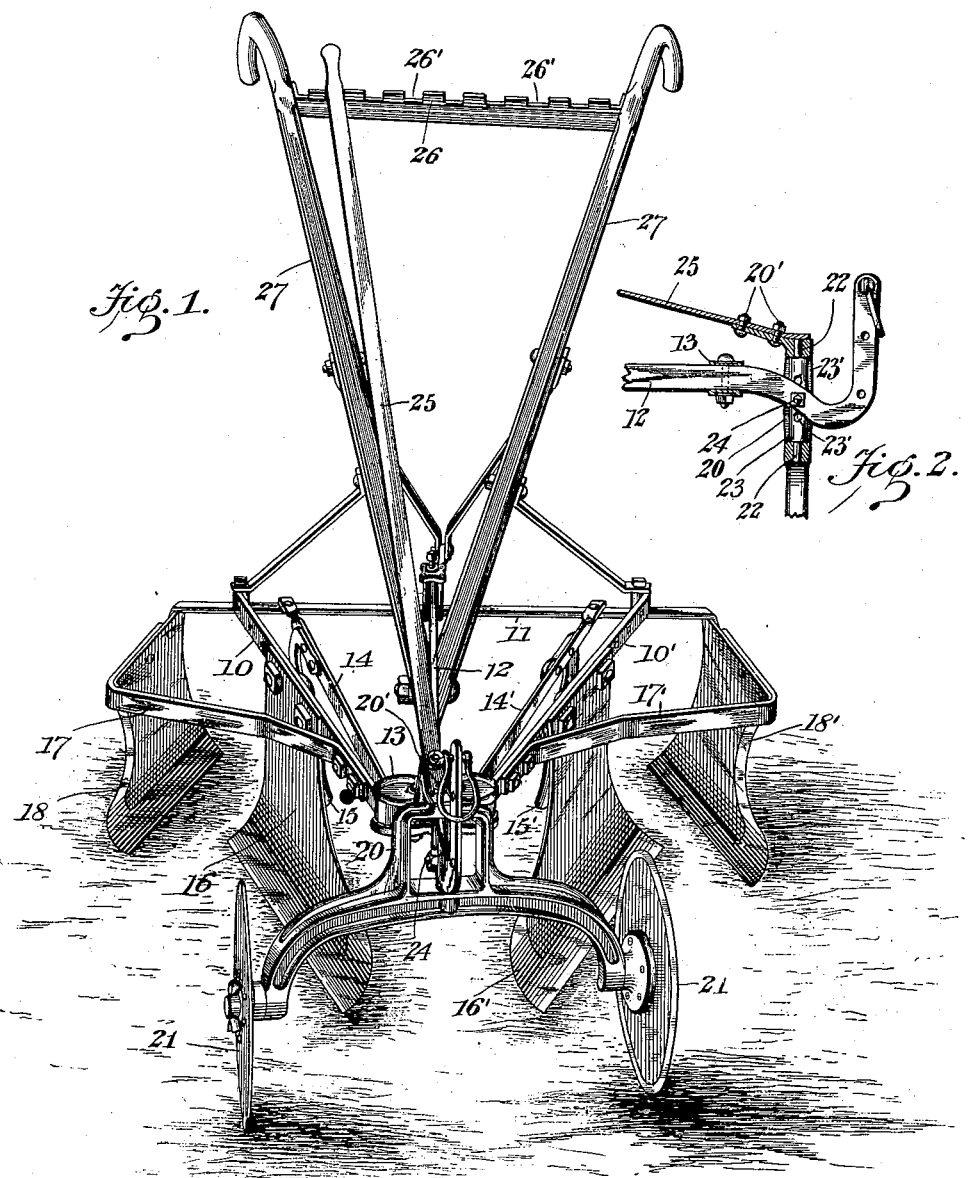

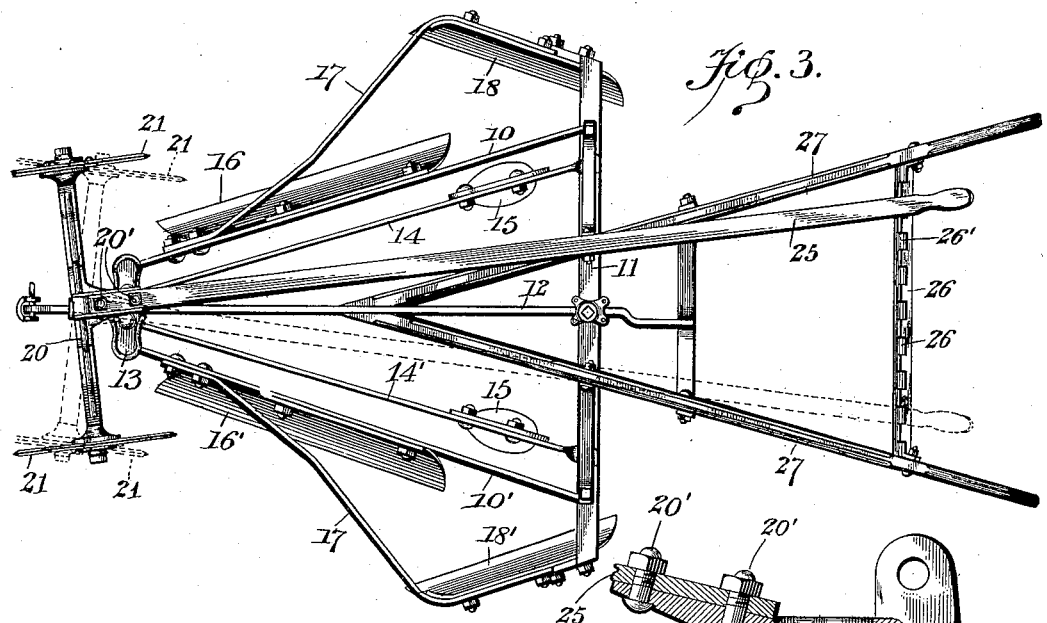
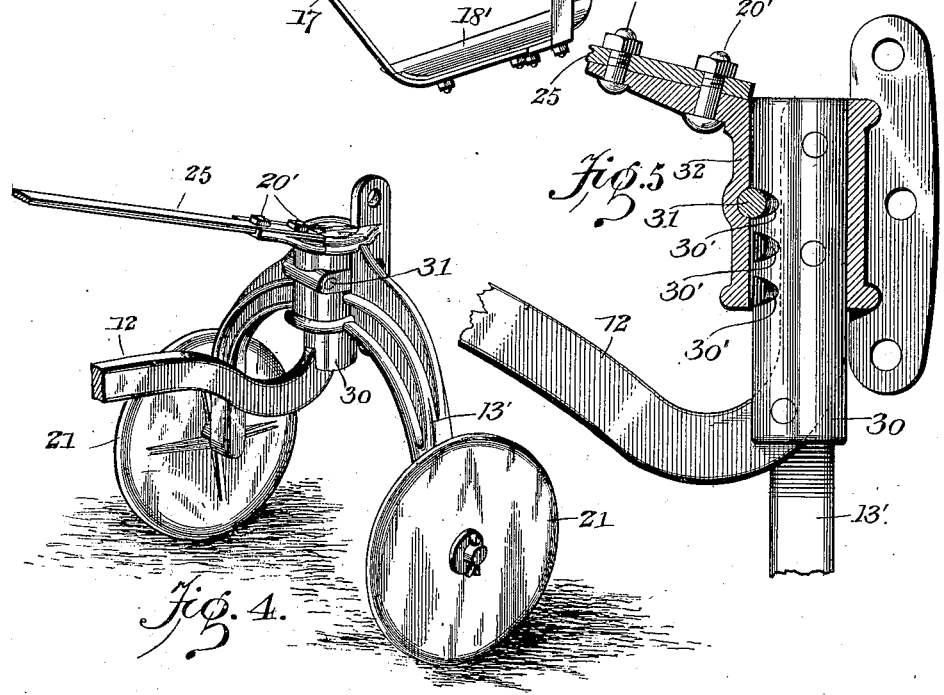

UNITED STATES PATENT OFFICE.

RICHARD J. GATLING, OF NEW YORK, N. Y.

CULTIVATOR.

SPECIFICATION forming part of Letters Patent No. 651,659, dated June 12, 1900.

Application filed August 10, 1899. Serial No. 726,777. (No model.)

*To all whom it may concern:*

Be it known that I, RICHARD J. GATLING, a citizen of the United States, residing in New York, in the county of New York and State of New York, have invented certain new and useful Improvements in Cultivators, of which the following is a specification.

This invention relates to cultivators, and more especially to those which are employed for cultivating small plants—such, for instance, as cotton, corn, &c.; and it has for its main object the provision of an improved implement of the class mentioned whereby a row of plants may be cultivated on both sides at the same time by first cutting a furrow in the ground and afterward refilling said furrow with loose earth, so as to render the ground susceptible of absorbing moisture or receiving fertilizer, as required.

Another object of the invention is to provide improved means whereby the front end of a cultivator may be properly guided by the operator, so that the moldboards will not injure the plants even if the draft of the horses should be an unequal one, in which case the cultivator would naturally be drawn to one side.

In the drawings accompanying and forming part of this specification, Figure 1 is a perspective view of a cultivator embodying my invention. Fig. 2 is a partial longitudinal central section of the steering-head. Fig. 3 is a top view of the cultivator; and Figs. 4 and 5 illustrate a modification of said steering-head, Fig. 4 being a perspective view, and Fig. 5 a central section, of the same.

Similar characters of reference designate like parts in all the figures of the drawings.

The cultivator constructed in accordance with my invention usually embodies a series of moldboards disposed at opposite sides of the longitudinal axis thereof and a series of scrapers whereby the earth which has been broken and turned out by said moldboards will be partly returned to the furrow and may be broken still more by shares properly placed in the rear of the moldboards.

In the drawings, 10 and 10' designate the side bars or frames of the cultivator, and these may be connected at their ends with a cross-brace 11 and a central brace 12, the side bars 10 and 10' converging toward the front, at which point they are connected, as by means of a cross-head 13, with said central brace 12.

Secured to the cross-head 13 and connected with the rear brace 11 are bars 14 and 14', which in some cases may be made adjustable laterally of the longitudinal axis of the machine and which carry shares 15 and 15', respectively, while to the side bars 10 and 10' may be secured moldboards, such as 16 and 16', the forward ends of which are separated by a space corresponding substantially to the width of the row of plants to be cultivated, so that when the implement is in operation said moldboards will not disturb the plants.

By the provision of a pair of moldboards disposed as above described any tendency to sidewise movement of the cultivator will be neutralized and the ground on both sides of the row will be broken at the same time.

Secured to the side bars 10 and 10' are auxiliary braces 17 and 17', which may carry scrapers, such as 18 and 18', whereby the earth which has been thrown to both sides of the row and in this manner broken to a greater or less extent may be partly returned and refill the furrow with loose earth.

From the foregoing it will be understood that a cultivator constructed in accordance with my invention will be adapted to perform a plurality of separate and distinct operations—first, that of loosening the earth by cutting the furrow therein on one side of a row, and, second, turning the loose earth back again into said furrow, both operations being repeated on the other side of the row—during a single travel thereof over a row of plants.

More or less difficulty would be encountered when horses of unequal strength are employed to draw the implement when the draft is not in line with the plants, in which case the machine would tend to leave its proper path and injure the plants of the row to be cultivated. On the other hand, it is well known that it is a laborious operation to guide properly an implement of this sort if the row of plants is not perfectly straight and regular. For this reason I provide guide-wheels at the front end of the cultivator whereby the machine may be properly guided, which wheels are under absolute control of the operator and form a hand-operated steering apparatus embodying a yoke 20, which carries the wheels 21, made in the present instance in the form of disks to more readily enter the ground and take a firm hold therein. The yoke 20 is pivoted on vertical trunnions 22, secured to a bar 23, which is held by a bolt 24 on the forward end of the central brace 12, said bolt 24 being adapted to enter any one of the holes 23' provided therefor in the bar 23, in which manner a vertical adjustment of the forward end of the brace 12 and its appurtenances relative to the yoke 20 may be had.

Inasmuch as the moldboards are indirectly connected with the central brace 12, it follows that the vertical adjustment of said brace 12 in the yoke 20 will result in a similar adjustment of the moldboards, which in this manner may be raised or lowered, so as to cut to a greater or less depth into the ground.

Secured to the upper end of the yoke 20, as at 20', (see Fig. 2,) is a lever 25, adapted to enter any one of the notches 26' of a bar 26, extending between the handles 27, said lever 25 constituting one form of guiding means for controlling the movements of the yoke 20, as will be readily understood.

In Figs. 4 and 5 is shown a modification of the steering-head in which the central brace 12 is set into and firmly secured in a spindle 30, which is provided with a series of particircumferential grooves 30', adapted to receive a pin or bolt 31, which is held in a sleeve 32, forming a part of the yoke 13'.

It is obvious that the construction of the moldboards and scrapers may be varied, and likewise many changes may be made in the particular construction of the steering device without in any way departing from the spirit of my invention.

Having described my invention, I claim—

1. In a cultivator, the combination, with a frame, of a pair of separated forwardly-converging oppositely-located moldboards adapted to form furrows; scrapers for refilling said furrows; dirigible wheel-supporting means adjustably connected to said frame; and a pair of guide-wheels journaled on said supporting means.

2. A cultivator comprising a frame; a pair of moldboards disposed at opposite sides of the longitudinal axis of said frame and converging toward the front thereof and separated by a relatively-wide space at their forward ends; a pair of scrapers; means for guiding the cultivator and comprising a pair of disk-shaped wheels; and means for controlling the position of said disk-shaped wheels.

3. A cultivator comprising a frame and two sets of soil-working devices secured thereto, each set comprising a pair of separated members, one set located in advance of the other, and one set having its members converging toward the front and the other set having its members converging toward the rear, and one set having its members intermediate the members of the other set.

4. A straddle-cultivator embodying a pair of moldboards disposed at opposite sides of the longitudinal axis of the cultivator and converging toward the front thereof and separated by a relatively-wide space at their forward ends, and a pair of scrapers disposed at opposite sides of the longitudinal axis of the cultivator and converging toward the rear thereof and separated by a relatively-wide space at their rear ends, and a pair of sharepoints disposed at opposite sides of the longitudinal axis of the cultivator and between the scrapers.

5. A cultivator comprising a frame; a pair of moldboards disposed at opposite sides of the longitudinal axis of the frame and converging toward the front thereof and separated by a relatively-wide space at their forward ends; a pair of scrapers also disposed at opposite sides of the longitudinal axis of said frame and converging toward the rear thereof and separated by a relatively-wide space at their rear ends; a pair of shares also disposed at opposite sides of the longitudinal axis of said frame and between the scrapers; and dirigible means embodying rotatable means for guiding the cultivator.

6. A cultivator comprising a frame; two sets of soil-working devices secured thereto, each set comprising a pair of separated members, one set located in advance of the other, and one set having its members converging toward the front and the other set having its members converging toward the rear, and one set having its members intermediate the members of the other set; and guiding means comprising a pair of wheels and means for controlling the same.

7. In a cultivator, the combination of a frame comprising a pair of bars converging toward their front ends and connected by a cross-bar adjacent to their rear ends; a pair of moldboards, one secured to each of said converging bars; a pair of braces secured to said converging bars and extending outwardly therefrom; a pair of scrapers one secured to each of said braces; means secured to said frame and comprising rotatable means for guiding said cultivator; and means for controlling said rotatable means.

8. In a cultivator, the combination of a frame comprising a pair of bars converging toward their front ends and connected by a cross-bar adjacent to their rear ends; a soil-working device secured to each of said bars; a second pair of bars converging toward their front ends and connected at their rear ends to said cross-bars; a soil-working device secured to each of said bars; a pair of braces secured to said first pair of bars and projecting outwardly therefrom; a soil-working device secured to each of said braces; handles secured to said frame; means for guiding said cultivator and comprising a yoke secured to said frame; a pair of disk-shaped wheels mounted on said yoke; and a lever adapted to actuate said yoke thereby to guide the frame.

9. A cultivator comprising a frame and three sets of soil-working devices carried thereby, the members of two of said sets converging toward their front ends, and the members of one set converging toward their rear ends, and the members of one set located in advance of the members of another set and separated from each other; and means for guiding said frame.

10. In a cultivator, the combination, with a frame comprising a plurality of bars one having a member projecting forwardly of the other bars; soil-working devices secured to some of said bars; a yoke provided with a pair of journals; a pair of wheels mounted on said journals, said yoke having a member adapted to be adjustably secured to said bar member, and one of said members having a series of openings any one of which is adapted to register with a single opening formed in its other member; means extending through the registered openings for securing said members together; and means connected with said yoke for adjusting the same.

11. In a cultivator, the combination, with a frame comprising a head and a plurality of bars, one of said bars projecting forwardly of the head and having an opening; soil-working devices secured to some of said bars; a yoke provided with journals; a pair of disks mounted on said journals; a bar pivotally secured at its upper and lower ends to said yoke and having connection with said forwardly-extending bar, and having a series of openings any one of which is adapted to register with the opening in said frame-bar whereby the yoke and frame may be adjustably connected; and removable means extending through the registered openings.

RICHARD J. GATLING.

Witnesses:
C. A. WEED,
CHARLES F. SCHMELZ.